US008099131B2

United States Patent
Rofougaran (10) Patent No.: US 8,099,131 B2
(45) Date of Patent: Jan. 17, 2012

(54) METHOD AND SYSTEM FOR ANTENNA ARCHITECTURE FOR MULTI-ANTENNA OFD BASED SYSTEMS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 836 days.

(21) Appl. No.: 11/536,685

(22) Filed: Sep. 29, 2006

(65) Prior Publication Data

US 2008/0081566 A1   Apr. 3, 2008

(51) Int. Cl.
*H04M 1/00*   (2006.01)
(52) U.S. Cl. .................... 455/562.1; 455/575.7; 455/129
(58) Field of Classification Search ............... 455/562.1, 455/561, 73, 575.7, 269, 279.1, 101, 129; 343/756, 909, 890; 375/347
See application file for complete search history.

(56) References Cited

U.S. PATENT DOCUMENTS

| 4,258,366 | A * | 3/1981 | Frosch et al. ............... 343/786 |
| 4,486,758 | A * | 12/1984 | de Ronde ............... 343/700 MS |
| 5,724,666 | A * | 3/1998 | Dent .......................... 455/562.1 |
| 5,943,372 | A * | 8/1999 | Gans et al. .................. 375/347 |
| 5,955,995 | A * | 9/1999 | Silverstein .................. 343/729 |
| 6,006,069 | A * | 12/1999 | Langston ........................ 455/62 |
| 6,020,858 | A * | 2/2000 | Sagisaka ....................... 343/771 |
| 6,104,347 | A * | 8/2000 | Snygg et al. ............ 343/700 MS |
| 6,246,380 | B1 * | 6/2001 | Chow ............................ 343/897 |
| 6,469,680 | B1 * | 10/2002 | Kelliher ........................ 343/893 |
| 6,658,269 | B1 * | 12/2003 | Golemon et al. .......... 455/562.1 |
| 6,845,243 | B1 * | 1/2005 | Gaddy et al. ................... 455/504 |
| 7,079,809 | B1 * | 7/2006 | Scherzer .......................... 455/39 |
| 7,538,944 | B2 * | 5/2009 | Matsuba et al. ......... 359/489.11 |
| 2007/0047678 | A1 * | 3/2007 | Sibecas et al. ............... 375/343 |

* cited by examiner

*Primary Examiner* — Sonny Trinh
(74) *Attorney, Agent, or Firm* — Farjami & Farjami LLP (57) ABSTRACT

Certain aspects of a method and system for an antenna architecture for multi-antenna orthogonal frequency division (OFD) based systems are disclosed. Aspects of one method may include communicating data in a radio frequency (RF) system comprising a plurality of antennas, via at least one polarized antenna that is orthogonally polarized with respect to adjacent polarized antennas. The plurality of coherently polarized antennas may be placed at a particular distance from each other.

24 Claims, 5 Drawing Sheets

FIG. 3B ately as shown in and/or described in connection with at least one of the figures, as set forth more completely in the claims.

METHOD AND SYSTEM FOR ANTENNA ARCHITECTURE FOR MULTI-ANTENNA OFD BASED SYSTEMS

CROSS-REFERENCE TO RELATED APPLICATIONS/INCORPORATION BY REFERENCE

This application makes reference to:
U.S. application Ser. No. 11/536,678, filed Sep. 29, 2006;
U.S. application Ser. No. 11/536,682, filed Sep. 29, 2006;
U.S. application Ser. No. 11/536,650, filed Sep. 29, 2006;
U.S. application Ser. No. 11/536,644, filed Sep. 29, 2006;
U.S. application Ser. No. 11/536,676, filed Sep. 29, 2006;
U.S. application Ser. No. 11/536,659, filed Sep. 29, 2006;
U.S. application Ser. No. 11/536,673, filed Sep. 29, 2006;
U.S. application Ser. No. 11/536,679, filed Sep. 29, 2006;
U.S. application Ser. No. 11/536,670, filed Sep. 29, 2006;
U.S. application Ser. No. 11/536,672, filed Sep. 29, 2006;
U.S. application Ser. No. 11/536,648, filed Sep. 29, 2006;
U.S. application Ser. No. 11/536,669, filed Sep. 29, 2006;
U.S. application Ser. No. 11/536,666, filed Sep. 29, 2006;
U.S. application Ser. No. 11/536,675, filed Sep. 29, 2006;
U.S. application Ser. No. 11/536,645, filed Sep. 29, 2006;
U.S. application Ser. No. 11/536,655, filed Sep. 29, 2006;
U.S. application Ser. No. 11/536,660, filed Sep. 29, 2006;
U.S. application Ser. No. 11/536,657, filed Sep. 29, 2006;
U.S. application Ser. No. 11/536,662, filed Sep. 29, 2006;
U.S. application Ser. No. 11/536,688, filed Sep. 29, 2006;
U.S. application Ser. No. 11/536,667, filed Sep. 29, 2006;
U.S. application Ser. No. 11/536,651, filed Sep. 29, 2006;
U.S. application Ser. No. 11/536,656, filed Sep. 29, 2006; and
U.S. application Ser. No. 11/536,663, filed Sep. 29, 2006.

Each of the above referenced applications is hereby incorporated herein by reference in its entirety.

FIELD OF THE INVENTION

Certain embodiments of the invention relate to wireless communication systems. More specifically, certain embodiments of the invention relate to a method and system for an antenna architecture for multi-antenna orthogonal frequency division (OFD) based systems.

BACKGROUND OF THE INVENTION

In most current wireless communication systems, nodes in a network may be configured to operate based on a single transmit and a single receive antenna. However, for many current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, CDMA-based systems, TDMA-based systems, WLAN systems, and OFDM-based systems such as IEEE 802.11a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

In order to transfer maximum energy or power between a transmit and a receive antenna, both antennas should have the same spatial orientation, the same polarization sense and the same axial ratio. When the antennas are not aligned or do not have the same polarization, there may be a reduction in energy or power transfer between the two antennas. This reduction in power transfer may reduce the overall system efficiency and performance. When the transmit and receive antennas are both linearly polarized, physical antenna misalignment may result in a polarization mismatch loss.

Multipath signals may arrive at a mobile handset antenna via the reflection of the direct signal off of nearby objects. If the reflecting objects are oriented such that they are not aligned with the polarization of the incident wave, the reflected wave may experience a shift in polarization shift. The resultant or total signal available to the receiver at either end of the communications link may be a vector summation of the direct signal and all of the multipath signals. In many instances, there may be a number of signals arriving at the receive site that are not aligned with the polarization of the system antenna. As the receive antenna rotates from vertical to horizontal, it may intercept or receive energy from these multiple signals.

In polarization diversity systems, a dual linear polarized antenna may be utilized to receive samples and track the polarization output providing the strongest signal level. Each output may provide a total signal that may be a combination of all incident signals. This combined signal may be a function of the amplitude and phase of each signal as well as the polarization mismatch of each signal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for an antenna architecture for multi-antenna orthogonal frequency division (OFD) based systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an antenna architecture for multi-antenna orthogonal frequency division (OFD) based systems. Certain aspects of the invention may include communicating data in a radio frequency (RF) system comprising a plurality of antennas, via at least one polarized antenna that is orthogonally polarized with respect to adjacent polarized antennas. The plurality of polarized antennas may be placed at a particular distance from each other.

Figure 1A:
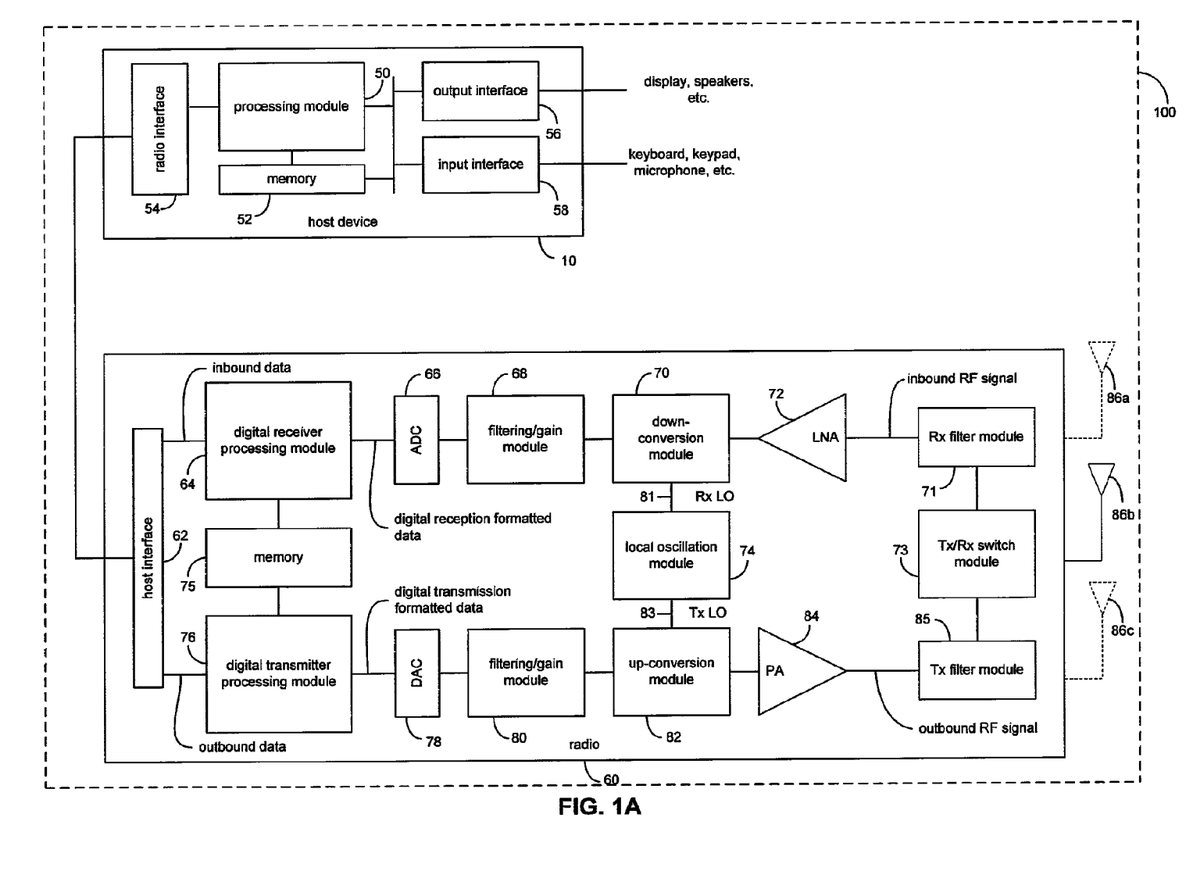
FIG. 1A is a block diagram illustrating a radio frequency (RF) system with a wireless communication host device and an associated radio, in accordance with an embodiment of the invention.

FIG. 1A is a block diagram illustrating a radio frequency (RF) system with a wireless communication host device and an associated radio, in accordance with an embodiment of the invention. Referring to FIG. 1A, there is shown a radio frequency (RF) system 100 that comprises a wireless communication host device 10 and an associated RF subsystem 60.

The wireless communication host device 10 may comprise a processing module 50, a memory 52, a radio interface 54, an input interface 58 and an output interface 56. The processing module 50 and the memory 52 may be enabled to execute a plurality of instructions. For example, for a cellular telephone host device, the processing module 50 may be enabled to perform the corresponding communication functions in accordance with a particular cellular telephone standard.

The radio interface 54 may be enabled to allow data to be received from and transmitted to the RF subsystem 60. The radio interface 54 may be enabled to provide the data received from the RF subsystem 60 to the processing module 50 for further processing and/or routing to the output interface 56. The output interface 56 may be enabled to provide connectivity to an output device such as a display, monitor, or speakers such that the received data may be displayed. The radio interface 54 may be enabled to provide data from the processing module 50 to the RF subsystem 60. The processing module 50 may be enabled to receive the outbound data from an input device such as a keyboard, keypad, or microphone via the input interface 58 or generate the data itself. The processing module 50 may be enabled to perform a corresponding host function on the data received via input interface 58 and/or route it to RF subsystem 60 via radio interface 54.

For cellular telephone hosts, RF subsystem 60 may be a built-in component. For personal digital assistants hosts, laptop hosts, and/or personal computer hosts, the RF subsystem 60 may be built-in or an externally coupled component. The RF subsystem 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and a plurality of antennas, antenna 1 86a, antenna 2 86b, and antenna 3 86c operatively coupled as shown. The antenna 2 86b may be shared by the transmit and receive paths as regulated by the Tx/Rx switch module 73.

Antenna 1 86a may be polarized with a zero degree polarization angle, for example. Antenna 2 86b may be orthogonally polarized with respect to antenna 1 86a, and may have a 90 degree polarization angle. Antenna 3 86c may be orthogonally polarized with respect to antenna 2 86b, and may be coherently polarized with respect to antenna 1 86a, and may have a zero degree or 180 degree polarization angle. The plurality of coherently polarized antennas, antenna 1 86a, and antenna 3 86c may be placed at a particular distance, d apart from each other. The plurality of antennas, antenna 1 86a, antenna 2 86b, and antenna 3 86c may be configured so as to provide isolation in space and/or time. The polarized antennas, antenna 1 86a, antenna 2 86b, and antenna 3 86c may enable reduction of space between the antennas and may provide isolation.

The digital receiver processing module 64 and the digital transmitter processing module 76, in combination with operational instructions stored in the memory 75, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 75 may be enabled to store, and digital receiver processing module 64 and/or digital transmitter processing module 76 may be enabled to execute, operational instructions corresponding to at least some of the functions illustrated herein.

In operation, the RF subsystem 60 may be enabled to receive outbound data from the wireless communication host device 10 via host interface 62. The host interface 62 may be enabled to route outbound data to the digital transmitter processing module 76. The digital transmitter processing module 76 may be enabled to process the outbound data in accordance with a particular wireless communication standard or protocol, for example, IEEE 802.11a, IEEE 802.11b, ZigBee, and Bluetooth to produce digital transmission formatted data. The digital transmission formatted data may be a digital baseband signal or a digital low IF signal, where the low IF may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or low IF signal, into an RF signal based on a transmitter local oscillation 83 provided by the local oscillation module 74. The power amplifier 84 may enable amplification of the RF signal to produce an outbound RF signal, which may be filtered by the transmitter filter module 85. The antenna 86b may be enabled to transmit the outbound RF signal to a targeted device such as a base station, an access point and/or another wireless communication device.

The RF subsystem 60 may be enabled to receive an inbound RF signal via antenna 86b, which was transmitted by a base station, an access point, or another wireless communication device. The antenna 86b may be enabled to communicate the inbound RF signal to the receiver filter module 71 via Tx/Rx switch module 73, where Rx filter module 71 bandpass filters inbound RF signal. The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data. The digital receiver processing module 64 may be enabled to decode, descramble, demap, and/or demodulate digital reception formatted data to recapture inbound data. The host interface 62 may be enabled to communicate the recaptured inbound data to the wireless communication host device 10 via the radio interface 54.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

Figure 1B:
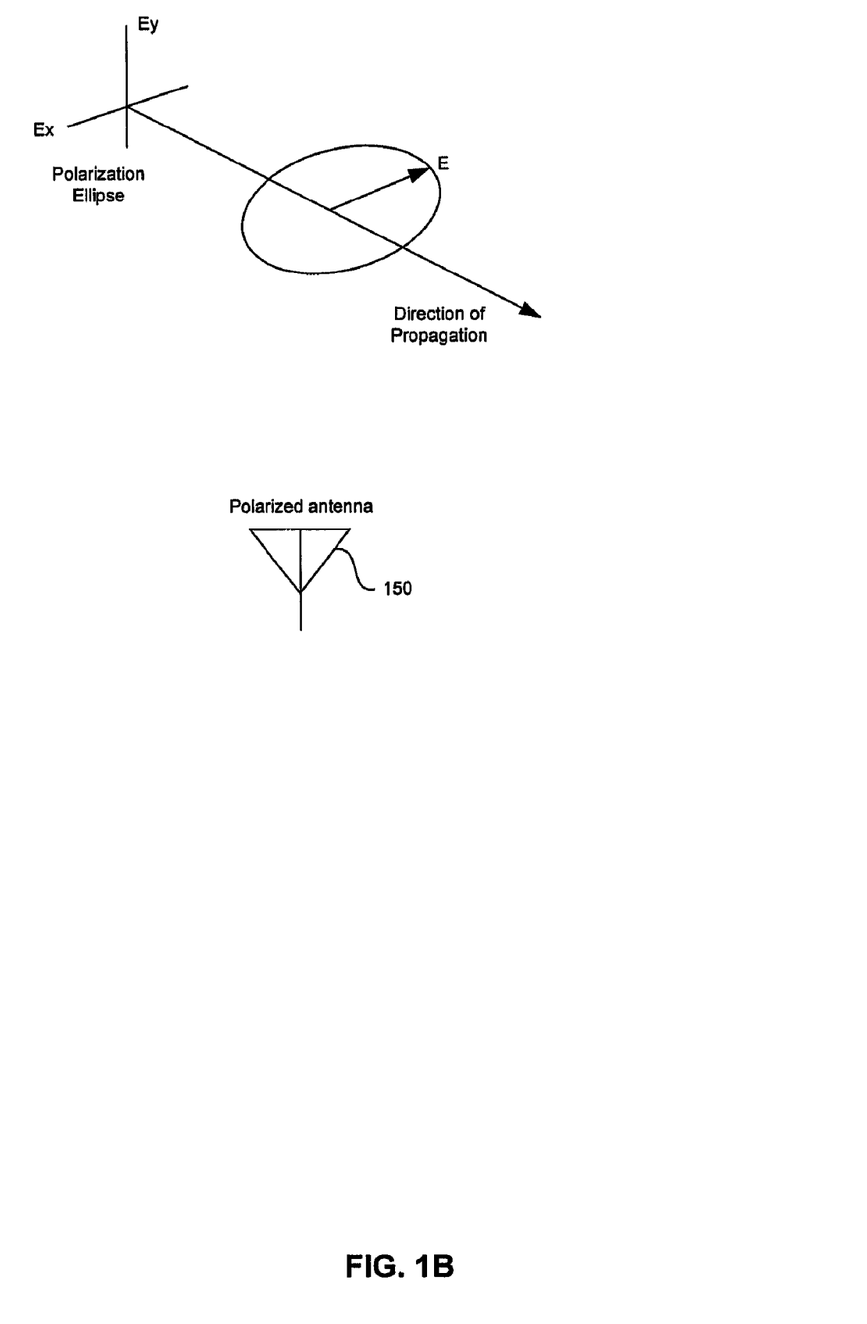
FIG. 1B is a diagram that illustrates antenna polarization in wireless communication systems, in accordance with an embodiment of the invention.

FIG. 1B is a diagram that illustrates antenna polarization in wireless communication systems, in accordance with an embodiment of the invention. Referring to FIG. 1B, there is shown a polarized antenna 150. The energy radiated by the polarized antenna 150 may be a transverse electromagnetic wave that comprises an electric field and a magnetic field. These fields are always orthogonal to one another and orthogonal to the direction of propagation. The electric field E of the electromagnetic wave may be utilized to describe its polarization. The total electric field of the electromagnetic wave may comprise two linear components, which are orthogonal to one another. Each of these components may have a different magnitude and phase. At any fixed point along the direction of propagation, the total electric field may trace an ellipse as a function of time. For example, at any instant in time, Ex is the component of the electric field in the x-direction and Ey is the component of the electric field in the y-direction. The total electric field E, is the vector sum of Ex and Ey.

The elliptical polarization may comprise two cases, for example, circular polarization and linear polarization. A circularly polarized electromagnetic wave may comprise two linearly polarized electric field components that are orthogonal, have equal amplitude and may be 90 degrees out of phase. In this case, the polarization ellipse traced by the wave is a circle. Depending upon the direction of rotation of the circularly polarized wave, the wave may be left hand circularly polarized or right hand circularly polarized. The phase relationship between the two orthogonal components, +90 degrees or −90 degrees, determines the direction of rotation. A linearly polarized electromagnetic wave may comprise a single electric field component and the polarization ellipse traced by the wave is a straight line.

Figure 2:
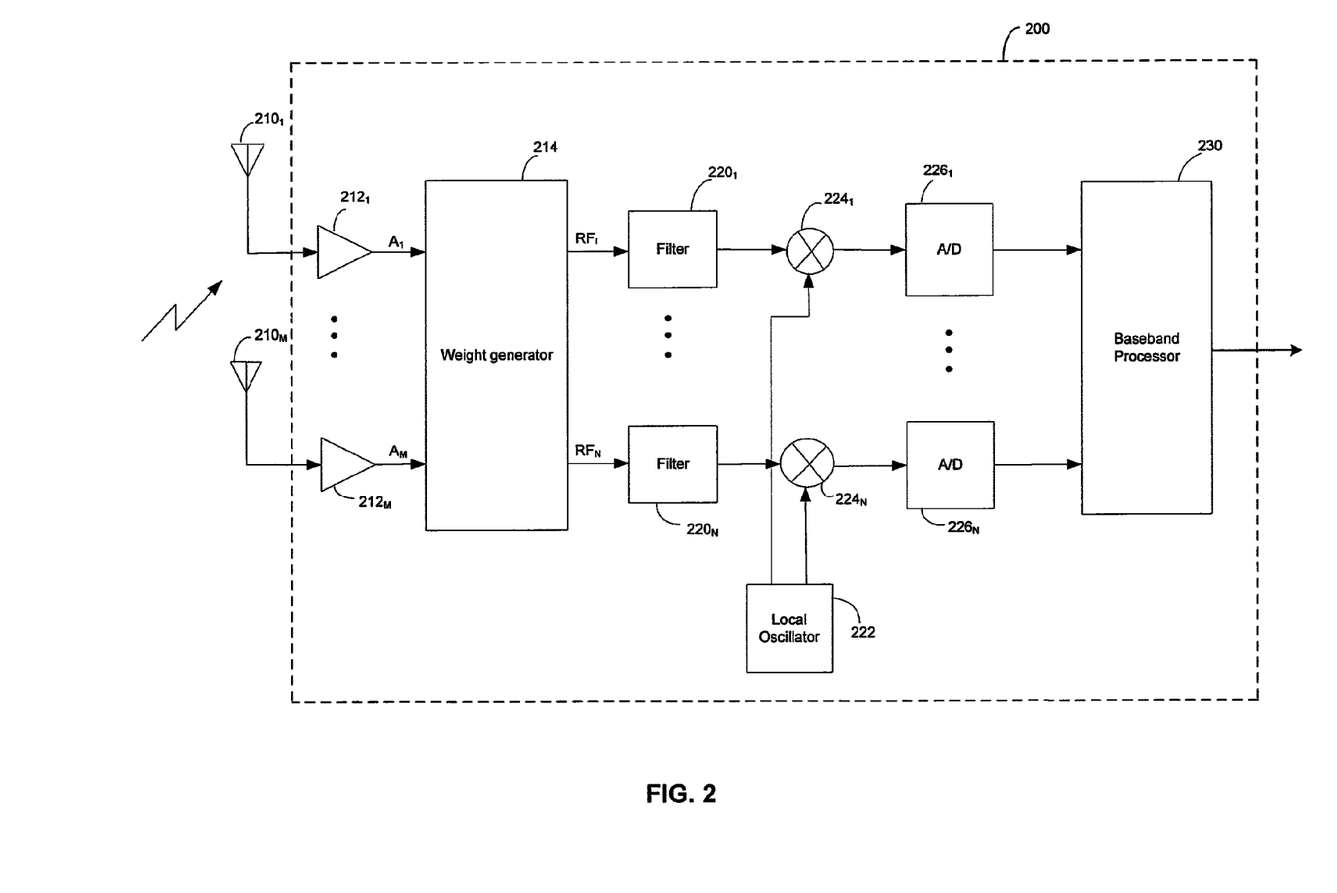
FIG. 2 is a block diagram of an exemplary radio frequency (RF) receiver, in accordance with an embodiment of the invention.

FIG. 2 is a block diagram of an exemplary radio frequency (RF) receiver antenna architecture for orthogonal frequency division (OFD) based systems, in accordance with an embodiment of the invention. Referring to FIG. 2, there is shown a RF receiver 200. The RF receiver 200 may comprise a plurality of polarized antennas $210_{1, 2, \ldots, M}$, a plurality of amplifiers $212_{1, 2, \ldots, M}$, a weight generation block 214, a plurality of filters $220_{1, 2, \ldots, N}$, a local oscillator 222, a plurality of mixers $224_{1, 2, \ldots, N}$, a plurality of analog to digital (A/D) converters $226_{1, 2, \ldots, N}$ and a baseband processor 230.

The plurality of polarized antennas $210_{1, 2, \ldots, M}$ may be enabled to receive the RF communication data/signals. The plurality of coherently polarized antennas among the plurality of polarized antennas $210_{1, 2, \ldots, M}$ may be placed at a particular distance d from each other. The amplifiers $212_{1, 2, \ldots, M}$ may be enabled to amplify the M received input RF signals. The weight generation block 214 may comprise a plurality of amplitude and phase shifters to compensate for the phase difference between various received input RF signals. Weights may be applied to each of the input signals $A_{1 \ldots M}$ to modify the phase and amplitude of a portion of the transmitted signals received by the plurality of receive antennas $212_{1 \ldots M}$ and generate a plurality of output signals $RF_{1 \ldots N}$. The plurality of filters $220_{1, 2, \ldots, N}$ may be enabled to filter frequency components of the RF substreams. The mixers $224_{1, 2, \ldots, N}$ may be enabled to downconvert the analog RF substreams to baseband. The local oscillator 222 may be enabled to provide a signal to the mixers $224_{1, 2, \ldots, N}$, which may be utilized to downconvert the analog RF substreams to baseband. The analog to digital (A/D) converters $226_{1, 2, \ldots, N}$ may be enabled to convert the analog baseband substreams into their corresponding digital substreams. The baseband processor 230 may be enabled to process the digital baseband substreams and multiplex the plurality of digital signals to generate output signals.

In operation, the RF signals may be received by a plurality of M polarized antennas $210_{1, 2, \ldots, M}$ at the receiver 200. Each of the M received signals may be amplified by a respective low noise amplifier $212_{1, 2, \ldots, M}$. A plurality of weights may be applied to each of the input signals $A_{1 \ldots M}$ to modify the phase and amplitude of a portion of the transmitted signals received by the plurality of receive antennas $212_{1 \ldots M}$. A plurality of output signals $RF_{1 \ldots N}$ may be generated, which may be filtered by a plurality of filters $220_{1, 2, \ldots, N}$. The resulting N filtered signals may then be downconverted to baseband utilizing a plurality of N mixers $224_{1, 2, \ldots, N}$, each of which may be provided with a carrier signal that may be generated by a local oscillator 222. The N baseband signals generated by the mixers 224$_{1, 2, \ldots, N}$ may then be converted to digital signals by a plurality of analog to digital (A/D) converters 226$_{1, 2, \ldots, N}$. The N digital signals may further be processed by a baseband processor 230 to generate the output signals.

In one embodiment of the invention, the baseband processor 230 may be operating in accordance with one or more standards, including but not limited to, IEEE 802.11, Bluetooth, ZigBee, advanced mobile phone services (AMPS), global systems for mobile communications (GSM), code division multiple access (CDMA), local multi-point distribution systems (LMDS), Worldwide Interoperability for Microwave Access (WiMAX), fourth generation (4G), orthogonal frequency division multiplexing (OFDM) based systems, digital video broadcasting handheld (DVB-H), multi-channel-multi-point distribution systems (MMDS), global positioning system (GPS), frequency modulation (FM), enhanced data rates for GSM evolution (EDGE) and/or variations thereof.

Figure 3A:
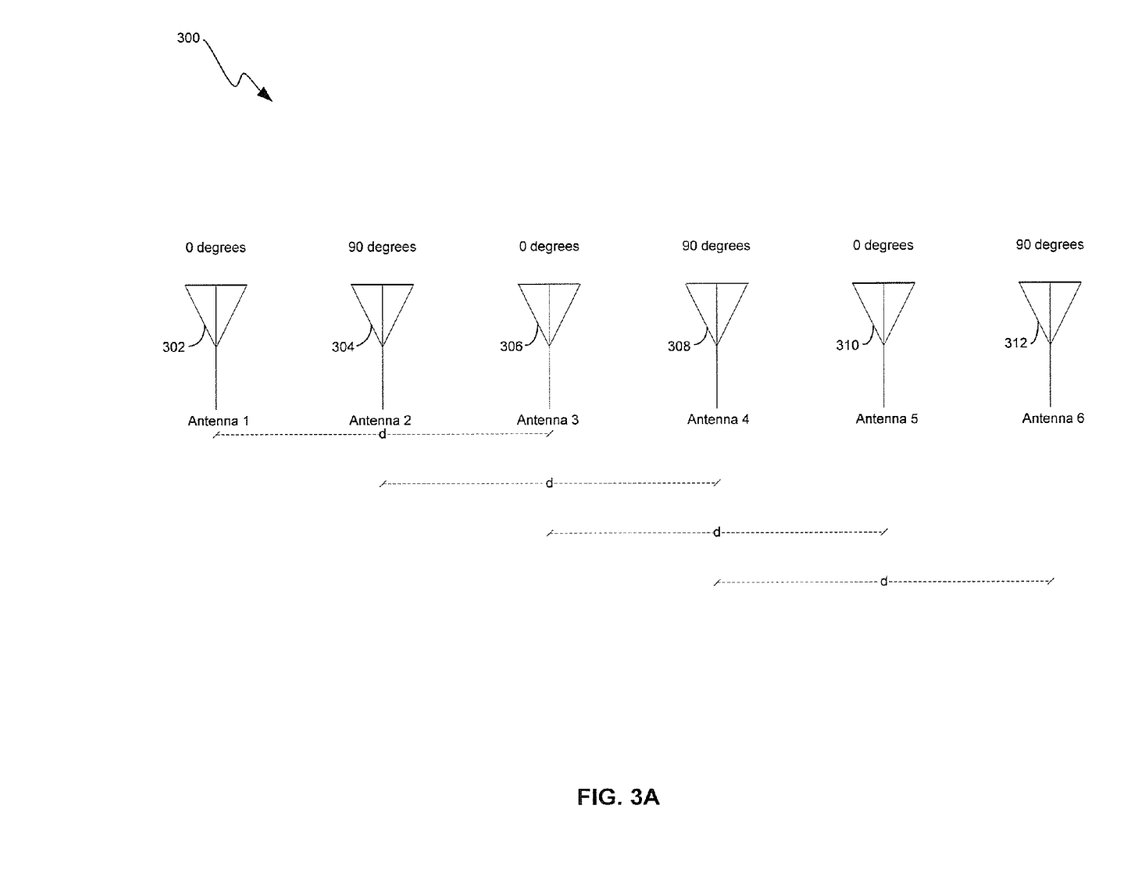
FIG. 3A is a diagram that illustrates an exemplary antenna architecture for multi-antenna orthogonal frequency division (OFD) based systems, in accordance with an embodiment of the invention.

FIG. 3A is a diagram that illustrates an exemplary antenna architecture for multi-antenna orthogonal frequency division (OFD) based systems, in accordance with an embodiment of the invention. Referring to FIG. 3A, there is shown a RF system 300 that comprises a plurality of antennas, antenna 1 302, antenna 2 304, antenna 3 306, antenna 4 308, antenna 5 310, and antenna 6 312.

The plurality of antennas, antenna 1 302, antenna 2 304, antenna 3 306, antenna 4 308, antenna 5 310, and antenna 6 312 may comprise suitable logic, circuitry, and/or code that may be enabled to provide transmission and reception of RF communication signals. In this regard, the plurality of antennas, antenna 1 302, antenna 2 304, antenna 3 306, antenna 4 308, antenna 5 310, and antenna 6 312 may be utilized for transmission and reception of a plurality of communication protocols including but not limited to, IEEE 802.11, Bluetooth, advanced mobile phone services (AMPS), global systems for mobile communications (GSM), code division multiple access (CDMA), local multi-point distribution systems (LMDS), Worldwide Interoperability for Microwave Access (WiMAX), fourth generation (4G), orthogonal frequency division multiplexing (OFDM) based systems, digital video broadcasting handheld (DVB-H), multi-channel-multi-point distribution systems (MMDS), global positioning system (GPS), frequency modulation (FM), enhanced data rates for GSM evolution (EDGE) and/or variations thereof.

Antenna 1 302 may be polarized with a zero degree polarization angle, for example. Antenna 2 304 may be orthogonally polarized with respect to antenna 1 302, and may have a 90 degree polarization angle. Antenna 3 306 may be orthogonally polarized with respect to antenna 2 304, and may be coherently polarized with respect to antenna 1 302, and may have a zero degree or 180 degree polarization angle. Similarly, antenna 4 308 may have a 90 degree polarization angle, antenna 5 310 may have either a zero degree or 180 degree polarization angle, and antenna 6 312 may have a 90 degree polarization angle. The plurality of coherently polarized antennas, antenna 1 302, antenna 3 306, and antenna 5 310 may be placed at a particular distance, d1, apart from each other. The plurality of coherently polarized antennas, antenna 2 304, antenna 4 308, and antenna 6 312 may be placed at a particular distance, d2, apart from each other. In an embodiment of the invention, the particular distance, d1, may or may not be equal to the particular distance, d2.

The plurality of antennas, antenna 1 302, antenna 2 304, antenna 3 306, antenna 4 308, antenna 5 310, and antenna 6 312 may be configured so as to provide isolation in space and/or time. The polarized antennas, antenna 1 302, antenna 2 304, antenna 3 306, antenna 4 308, antenna 5 310, and antenna 6 312 may enable reduction of space between the antennas and may provide isolation.

Figure 3B:
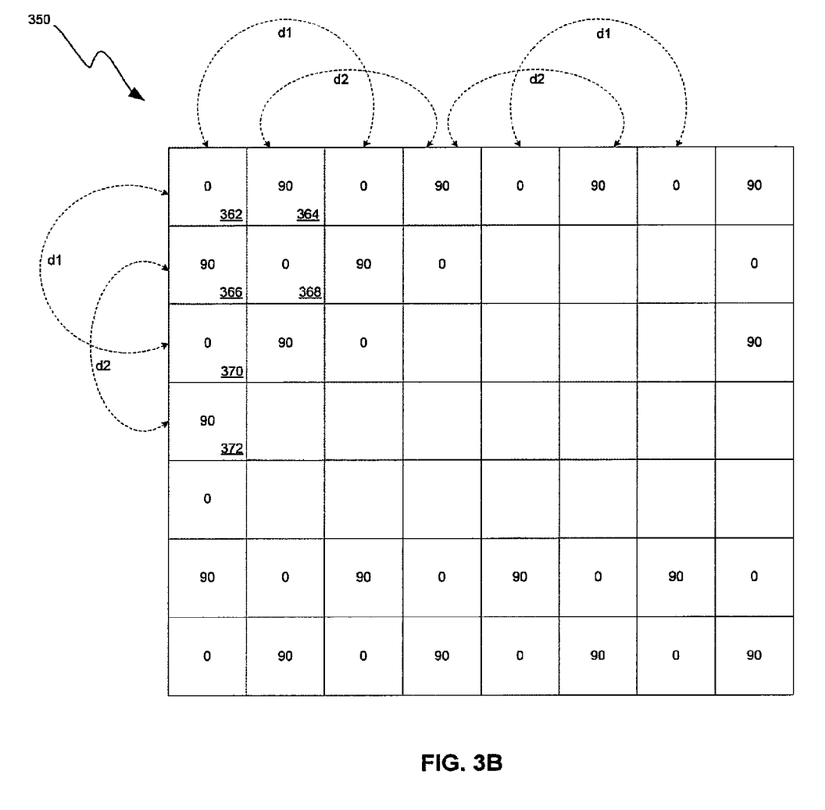
FIG. 3B is a diagram that illustrates another exemplary antenna architecture for multi-antenna orthogonal frequency division (OFD) based systems, in accordance with an embodiment of the invention.

FIG. 3B is a diagram that illustrates another exemplary antenna architecture for multi-antenna orthogonal frequency division (OFD) based systems, in accordance with an embodiment of the invention. Referring to FIG. 3B, there is shown a RF system 300 that comprises a plurality of antennas that may be arranged in a matrix 350. Each cell within the matrix may comprise one polarized antenna.

Antenna 1 in the first cell 362 may be polarized with a zero degree polarization angle, for example. Antenna 2 in the adjacent cell 364 may be orthogonally polarized with respect to antenna 1 in the first cell 360, and may have a 90 degree polarization angle. Antenna 3 in the third cell 366 may be orthogonally polarized with respect to antenna 1 in cell 362, and may be coherently polarized with respect to antenna 2 in cell 364, and may have a 90 degree polarization angle. Similarly, antenna 4 in cell 368 may be coherently polarized with respect to antenna 1 in cell 362, and may be orthogonally polarized with respect to antenna 2 in cell 364, and antenna 3 in cell 366, and may have either a zero degree or 180 degree polarization angle. Antenna 5 in cell 370 may be coherently polarized with respect to antenna 4 in cell 368, and may be orthogonally polarized with respect to antenna 3 in cell 366, and may have either a zero degree or 180 degree polarization angle. Antenna 6 in cell 372 may be orthogonally polarized with respect to antenna 5 in cell 370, and may have a 90 degree polarization angle.

The plurality of coherently polarized antennas, antenna 1 in cell 362, antenna 4 in cell 368, and antenna 5 in cell 370 may be placed at a particular distance, d1, apart from each other. The plurality of coherently polarized antennas, antenna 2 in cell 364, antenna 3 in cell 366, may be placed at a particular distance, d2, apart from each other. The plurality of coherently polarized antennas, antenna 3 in cell 366 and antenna 6 in cell 372 may be placed at a particular distance, d2, apart from each other. In an embodiment of the invention, the particular distance, d1, may or may not be equal to the particular distance, d2.

In accordance with an embodiment of the invention, a method and system for an antenna architecture for multi-antenna orthogonal frequency division (OFD) based systems may comprise a radio frequency (RF) system 100 comprising a plurality of polarized antennas 86*a*, 86*b*, and 86*c*, for example. The RF system 100 may comprise a processing module 50 for communicating data via the plurality of polarized antennas, 86*a*, 86*b*, and 86*c*. The RF system 300 (FIG. 3A) may comprise at least one polarized antenna, for example, antenna 3 306 that is orthogonally polarized with respect to adjacent polarized antennas, antenna 2 304 and antenna 4 308. The polarized antenna, antenna 3 306 may be placed at a particular distance, d from at least one other polarized antenna, for example, antenna 1 302 that is coherently polarized with respect to the polarized antenna, antenna 3 306. The adjacent polarized antenna, antenna 2 304 may be placed at a particular distance, d from at least one other polarized antenna, antenna 4 308, that is coherently polarized with respect to the adjacent polarized antenna, antenna 2 304. At least one polarized antenna, antenna 3 306 that is orthogonally polarized with respect to adjacent polarized antennas, antenna 2 304 and antenna 4 308 may be enabled to transmit and/or receive data. The filtering/gain module 68 may be enabled to filter the received RF signal. The analog-to-digital converter (A/D) 66 may be enabled to convert the received RF data to digital data.

Another embodiment of the invention may provide a machine-readable storage, having stored thereon, a computer program having at least one code section executable by a machine, thereby causing the machine to perform the steps as described above for an antenna architecture for multi-antenna orthogonal frequency division (OFD) based systems. For example, any one or more of the components in the wireless communication host device 10 and/or the RF subsystem 60 may be controlled via code such as software and/or firmware. In this regard, in an exemplary embodiment of the invention, any one or more of the digital receiver processing module 64, ADC 66, filtering/gain module 68, down-conversion module 70, LNA 72 and Rx filter module 71 may be programmably controlled by code comprising software and/or firmware. In another exemplary embodiment of the invention, any one or more of the digital transmitter processing module 76, DAC 78, filtering/gain module 80, up-conversion module 82, PA 84, and Tx filter module 86, may be programmably controlled by code comprising software and/or firmware.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication network, the method comprising:
   in a radio frequency (RF) system comprising a plurality of polarized antennas:
      communicating data using a first of said plurality of polarized antennas, said first of said plurality of polarized antennas being orthogonally polarized with respect to adjacent ones of said plurality of polarized antennas, wherein:
         said first of said plurality of polarized antennas is located at an equal distance from corresponding non-adjacent ones of said plurality of polarized antennas; and
         said corresponding non-adjacent ones of said plurality of polarized antennas being coherently polarized with respect to said first of said plurality of polarized antennas.

2. The method according to claim 1, comprising placing said first of said plurality of polarized antennas at said equal distance from said corresponding non-adjacent ones of said plurality of polarized antennas.

3. The method according to claim 1, comprising placing each of said adjacent ones of said plurality of polarized antennas at said equal distance from said corresponding non-adjacent ones of said plurality of polarized antennas.

4. The method according to claim 1, comprising transmitting said data using said first of said plurality of polarized antennas, wherein said first of said plurality of polarized antennas is orthogonally polarized with respect to said adjacent ones of said plurality of polarized antennas.

5. The method according to claim 1, comprising receiving said data using said first of said plurality of polarized antennas, wherein said first of said plurality of polarized antennas is orthogonally polarized with respect to said adjacent ones of said plurality of polarized antennas.

6. The method according to claim 5, comprising filtering said received data using said first of said plurality of polarized antennas.

7. The method according to claim 5, comprising converting said received data using said first of said plurality of polarized antennas to digital data.

8. The method according to claim 1, comprising communicating data using a first of said adjacent ones of said plurality of polarized antennas, wherein:
   said first of said adjacent ones of said plurality of polarized antennas is located at an equal distance from corresponding non-adjacent ones of said adjacent ones of said plurality of polarized antennas; and
   said corresponding non-adjacent ones of said adjacent ones of said plurality of polarized antennas being coherently polarized with respect to said first of said adjacent ones of said plurality of polarized antennas.

9. A non-transitory machine-readable storage having stored thereon, a computer program having at least one code section for processing signals in a communication network, the at least one code section being executable by a machine for causing the machine to perform steps comprising:
   in a radio frequency (RF) system comprising a plurality of polarized antennas:
      communicating data using a first of said plurality of polarized antennas, said first of said plurality of polarized antennas being orthogonally polarized with respect to adjacent ones of said plurality of polarized antennas, wherein:
         said first of said plurality of polarized antennas is located at an equal distance from corresponding non-adjacent ones of said plurality of polarized antennas; and
         said corresponding non-adjacent ones of said plurality of polarized antennas being coherently polarized with respect to said first of said plurality of polarized antennas.

10. The non-transitory machine-readable storage according to claim 9, wherein said at least one code section comprises code for placing said first of said plurality of polarized antennas at said equal distance from said corresponding non-adjacent ones of said plurality of polarized antennas.

11. The non-transitory machine-readable storage according to claim 9, wherein said at least one code section comprises code for placing each of said adjacent ones of said plurality of polarized antennas at said equal distance from said corresponding non-adjacent ones of said plurality of polarized antennas.

12. The non-transitory machine-readable storage according to claim 9, wherein said at least one code section comprises code for transmitting said data using said first of said plurality of polarized antennas, wherein said first of said plurality of polarized antennas is orthogonally polarized with respect to said adjacent ones of said plurality of polarized antennas.

13. The non-transitory machine-readable storage according to claim 9, wherein said at least one code section comprises code for receiving said data using said first of said plurality of polarized antennas, wherein said first of said plurality of polarized antennas is orthogonally polarized with respect to said adjacent ones of said plurality of polarized antennas.

14. The non-transitory machine-readable storage according to claim 13, wherein said at least one code section comprises code for filtering said received data using said first of said plurality of polarized antennas.

15. The non-transitory machine-readable storage according to claim 13, wherein said at least one code section comprises code for converting said received data using said first of said plurality of polarized antennas to digital data.

16. The non-transitory machine-readable storage according to claim 9, wherein said at least one code section comprises code for communicating data using a first of said adjacent ones of said plurality of polarized antennas, wherein:
    said first of said adjacent ones of said plurality of polarized antennas is located at an equal distance from corresponding non-adjacent ones of said adjacent ones of said plurality of polarized antennas; and
    said corresponding non-adjacent ones of said adjacent ones of said plurality of polarized antennas being coherently polarized with respect to said first of said adjacent ones of said plurality of polarized antennas.

17. A system for processing signals in a communication network, the system comprising:
    one or more circuits for use within a radio frequency (RF) system comprising a plurality of polarized antennas, said one or more circuits being operable to communicate data using a first of said plurality of polarized antennas, said first of said plurality of polarized antennas being orthogonally polarized with respect to adjacent ones of said plurality of polarized antennas, wherein:
        said first of said plurality of polarized antennas is located at an equal distance from corresponding non-adjacent ones of said plurality of polarized antennas; and
        said corresponding non-adjacent ones of said plurality of polarized antennas being coherently polarized with respect to said first of said plurality of polarized antennas.

18. The system according to claim 17, wherein said first of said plurality of polarized antennas is placed at said equal distance from said corresponding non-adjacent ones of said plurality of polarized antennas.

19. The system according to claim 17, wherein each of said adjacent ones of said plurality of polarized antennas is placed at said equal distance from said corresponding non-adjacent ones of said plurality of polarized antennas.

20. The system according to claim 17, wherein said one or more circuits are operable to transmit said data using said first of said plurality of polarized antennas, wherein said first of said plurality of polarized antennas is orthogonally polarized with respect to said adjacent ones of said plurality of polarized antennas.

21. The system according to claim 17, wherein said one or more circuits are operable to receive said data using said first of said plurality of polarized antennas, wherein said first of said plurality of polarized antennas is orthogonally polarized with respect to said adjacent ones of said plurality of polarized antennas.

22. The system according to claim 21, wherein said one or more circuits are operable to filter said received data using said first of said plurality of polarized antennas.

23. The system according to claim 21, wherein said one or more circuits are operable to convert said received data using said first of said plurality of polarized antennas to digital data.

24. The system according to claim 17, wherein said one or more circuits are operable to communicate data using a first of said adjacent ones of said plurality of polarized antennas, wherein:
    said first of said adjacent ones of said plurality of polarized antennas is located at an equal distance from corresponding non-adjacent ones of said adjacent ones of said plurality of polarized antennas; and
    said corresponding non-adjacent ones of said adjacent ones of said plurality of polarized antennas being coherently polarized with respect to said first of said adjacent ones of said plurality of polarized antennas.

* * * * *